(12) United States Patent
Lungwitz et al.

(10) Patent No.: US 7,240,293 B2
(45) Date of Patent: Jul. 3, 2007

(54) METHOD AND DEVICE FOR INPUTTING A SEQUENCE OF CHARACTERS

(75) Inventors: Thomas Lungwitz, Stuttgart (DE); Robert Grudszus, Gerlingen (DE); Martin Kossira, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 728 days.

(21) Appl. No.: 10/276,121

(22) PCT Filed: May 11, 2001

(86) PCT No.: PCT/DE01/01793

§ 371 (c)(1),
(2), (4) Date: Apr. 4, 2003

(87) PCT Pub. No.: WO01/86404

PCT Pub. Date: Nov. 15, 2001

(65) Prior Publication Data

US 2003/0154327 A1    Aug. 14, 2003

(30) Foreign Application Priority Data

May 11, 2000  (DE) .............................. 100 22 970

(51) Int. Cl.
*G06F 17/00* (2006.01)

(52) U.S. Cl. ................. 715/780; 715/773; 715/866; 345/156; 345/157; 701/208; 701/209

(58) Field of Classification Search ............... 715/700, 715/764, 780, 866, 864, 773, 858, 860; 701/201, 701/202, 208, 209; 345/168, 173, 156, 157
See application file for complete search history.

(56) References Cited

U.S. PATENT DOCUMENTS

| | | | | |
|---|---|---|---|---|
| 4,737,927 A * | 4/1988 | Hanabusa et al. | .......... | 701/200 |
| 5,963,671 A | 10/1999 | Strohm et al. | | |
| 5,973,621 A * | 10/1999 | Levy | ............................ | 341/22 |
| 6,037,942 A | 3/2000 | Millington | | |
| 6,115,669 A * | 9/2000 | Watanabe et al. | ............ | 701/209 |
| 6,573,844 B1 * | 6/2003 | Venolia et al. | ................. | 341/22 |
| 6,608,639 B2 * | 8/2003 | McGovern | ................... | 715/780 |
| 6,646,572 B1 * | 11/2003 | Brand | .......................... | 341/22 |

FOREIGN PATENT DOCUMENTS

WO   WO 99 30222    6/1999

OTHER PUBLICATIONS

Nantais et al., *A Predictive Selection Technique for Single-Digit With a Visual Keyboard*, IEEE Transactions on Rehabilitation Engineering, vol. 2, No. 3, IEEE Inc., NY, Sep. 1, 1994.

* cited by examiner

*Primary Examiner*—Tadesse Hailu
(74) *Attorney, Agent, or Firm*—Kenyon & Kenyon LLP

(57) ABSTRACT

A method is proposed for the input of a character string into a processing unit, in which in a two-dimensional character field, a character to be input is determined from selectable characters for an input. In this context, the intuitive detection of a user input permits a simple navigation with the aid of a direction-input device in the thinned-out, two-dimensional character field between the selectable characters.

18 Claims, 19 Drawing Sheets

METHOD AND DEVICE FOR INPUTTING A SEQUENCE OF CHARACTERS

FIELD OF THE INVENTION

The present invention relates to a method for inputting a character string.

BACKGROUND INFORMATION

Character strings are generally input into a computing device using a keyboard which provides one key for each character. For devices which have only little space available for a keyboard, such as telephones or navigation devices, it is known to combine a multitude of alphabetical letters using in each case one key, and to pick out the suitable letter by a corresponding selection after pressing this key. However, this method likewise requires a minimum number of keys available to a user. It is furthermore known to provide the user with a list from which he/she is able to select individual characters. In this case, for example, the list is formed such that only inputtable characters are selected. However, a user must go through a possibly long list of characters for each input to in each case reach the character he wants in the linearly displayed list.

SUMMARY OF THE INVENTION

The method of the present invention, on the other hand, has the advantage that characters to be selected are displayed in a two-dimensional field, and that by the input of a direction along the lines of the present invention, a user is able to shift very quickly and clearly between selectable characters and to combine the input characters to form a character string stored in a processing unit allocated to the input device, since it is not necessary to go through a long list in order to input a character, but rather free movement is provided in the two-dimensional field between the selectable characters. It is thereby possible to dispense with a keyboard in the conventional sense, since only one operating element for a direction input and one operating element for confirming the inputtable character are used. In this way, the input of alphabetical letters is advantageously made possible even for applications for which only a little space is available for operating elements and keys, thus, for example, in the case of mobile hand-held instruments or processing units installed in vehicles. In this context, it is particularly advantageous that an intuitive control is possible solely between the selectable characters, while the non-selectable characters are nevertheless displayed. A change between an inputtable character that is able to be input via a confirmation input, e.g. via a confirmation key, and another selectable character is effected in the manner that, as a function of the direction input, a different selectable character is selected as inputtable character which is now able to be input via the confirmation key. The previously inputtable character is now no longer able to be input directly via the confirmation key, so that there is a clear allocation of the confirmation key to one character.

Advantageous further refinements and improvements of the method are rendered possible by the measures specified. It is particularly advantageous to arrange the characters in the field in rows and columns, and to select a most proximate character in the respective nearest row or column in the desired direction for a direction specification. Orientation to the nearest row or column makes it possible for a user to find his way intuitively between the indicated characters in the two-dimensional field. In this connection, it is particularly advantageous that, given a plurality of characters in one row or column, the character nearest in each case to the originally inputtable character is determined as the new inputtable character in the processing unit.

In addition, after the input of a character, it is advantageous to select a new, inputtable character at least in the vicinity of the previously input character, since a user still has his eye directed toward this previously input character. Furthermore, it is advantageous to choose the new character to be selected as much in the middle of the display as possible, since a movement to a new character to be selected thereby goes very quickly on statistical average, because all characters to be selected are equally far from the middle of a display.

Moreover, using the processing unit, it is advantageous to automatically supplement an input character string to form a desired character string, provided an input character string is only able to be combined in a clear-cut manner to form a character string stored in the memory unit assigned to the processing unit.

BRIEF DESCRIPTION OF THE DRAWINGS

FIGS. 9a through 9i show a display representation for an implementation of the method according to the present invention, given a use of the comparison described with respect to FIG. 6a.

DETAILED DESCRIPTION

The method according to the present invention for the input of a character string into a processing unit may be used for all types of processing units. In particular, it is provided for processing units for which only a small space is available or desired for operating elements and displays. The method of the present invention may be used particularly for the input of character strings, especially letter strings, for navigation devices in vehicles, preferably in motor vehicles, portable small computers, so-called personal digital assistants (PDA), for mobile telephones as well as for mobile Internet terminals. The mode of operation of the method according to the present invention is explained in the following in terms of a navigation device disposed in a motor vehicle.

Figure 1:
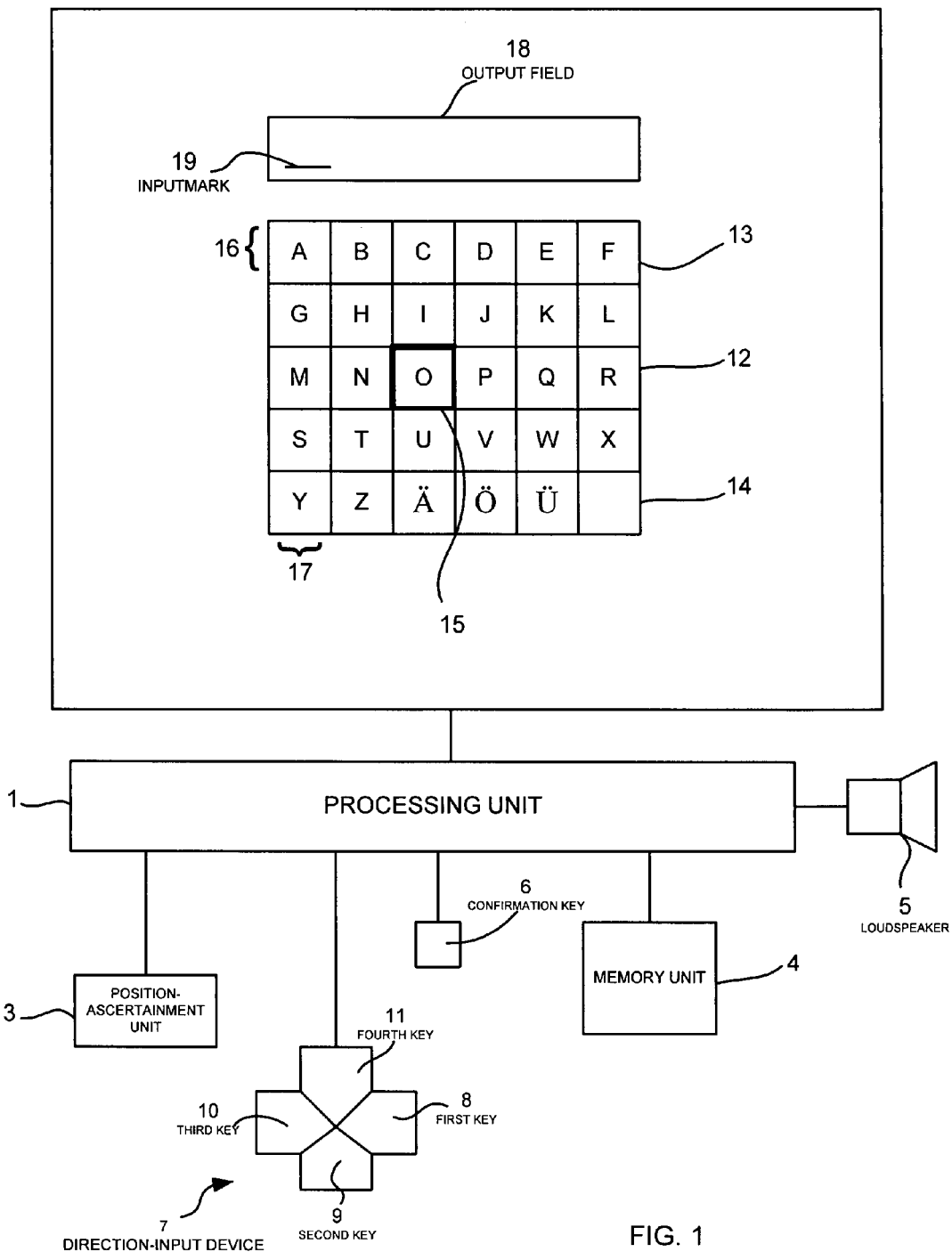
FIG. 1 shows a navigation device having a processing unit, a display and operating device for carrying out the method of the present invention.

FIG. 1 shows a navigation device arranged in a vehicle. The navigation device is made of a processing unit 1 which is connected to a display 2. Processing unit 1 is also connected to a position-ascertainment unit 3, preferably to a GPS receiver (GPS=Global Positioning System). Processing unit 1 is further connected to a memory unit 4, a loudspeaker 5, a confirmation key 6, as well as a direction-input device 7 having a first key 8, a second key 9, a third key 10 and a fourth key 11. In display 2 in FIG. 1, a character field 12 is depicted which contains alphabetical letters 13 and special characters, here a blank character 14. For reasons of clarity in the drawing, only one letter is specially denoted. Furthermore, one letter, here the letter "O", is set off by a selection frame 15 in character field 12. Character field 12 has rows 16 and columns 17, so that character field 12 forms a two-dimensional arrangement, and a letter is clearly defined by the specification of a row and a column. An output field 18 in which an input mark 19 is shown is also indicated in display 2. In one preferred exemplary embodiment, direction-input device 7 is implemented as a cross rocker in which keys 8, 9, 10 and 11 are rigidly joined to one another, and pressure on the cross rocker in the region of one of the keys results in actuation of the respective key pressed. In an exemplary embodiment not shown in FIG. 1, the direction-input device may also be implemented as a so-called joystick, in which a direction input is transmitted to processing unit 1 by a movement of an input pin in a desired direction. A design as a trackball is also possible, in which a ball in a holding device is moved in a desired direction, and this movement is detected by processing unit 1. In the exemplary embodiment shown in FIG. 1, a pressure on first key 8 is judged as a desire for a movement to the right with respect to a character denoted by selection frame 15 in character field 12. A pressure on second key 9 is evaluated as a movement downward in character field 12 with respect to the character denoted by selection frame 15. A pressure on third key 10 is judged accordingly as a movement to the left, and a pressure on fourth key 11 is judged accordingly as a movement upward. In one preferred exemplary embodiment, initially a character is sought which is in the same column or in the same row as the inputtable character denoted before by selection frame 15. Always only one character is set off by selection frame 15 at any one time in character field 12. In the exemplary embodiment shown in FIG. 1, character field 12 is square. However, a rectangular arrangement of the character field is also possible, in which, for example, the number of columns exceeds the number of rows. In an arrangement having an equal number of columns and rows, the maximum distance to be covered between two characters is minimal. A character in character field 12 set off by selection frame 15 is able to be confirmed by operation of confirmation key 6, processing unit 1 detecting an actuation of confirmation key 6, and detecting the character set off by selection frame 15 as the input character, and adding it to the previously input character string, which is then displayed in output field 18. In one preferred specific embodiment, display 2 is implemented as a liquid-crystal display. However, other types of displays, e.g. electroluminescent displays or cathode-ray tube displays are also possible. Processing unit 1 compares the character string, input with the aid of direction-input device 7 and confirmation key 6, to character string stored in memory unit 4, preferably a hard disk, a compact disk (CD) or a main memory and, in the event an input character string agrees with a stored character string, determines this character string as a traveling destination to be newly selected. Display 2 and confirmation key 6, as well as direction-input device 7 are arranged so that they are easily accessible for a driver in the vehicle. In one preferred exemplary embodiment, the remaining elements may be hidden from the driver, for example, behind the dashboard panel. As one preferred practical embodiment, confirmation key 6 is introduced into direction-input device 7, for example, as a pushbutton arranged in the center between keys 8, 9, 10, 11. In one embodiment, the confirmation may be effected as a cross rocker by a central pressure on the cross rocker.

Figure 2:
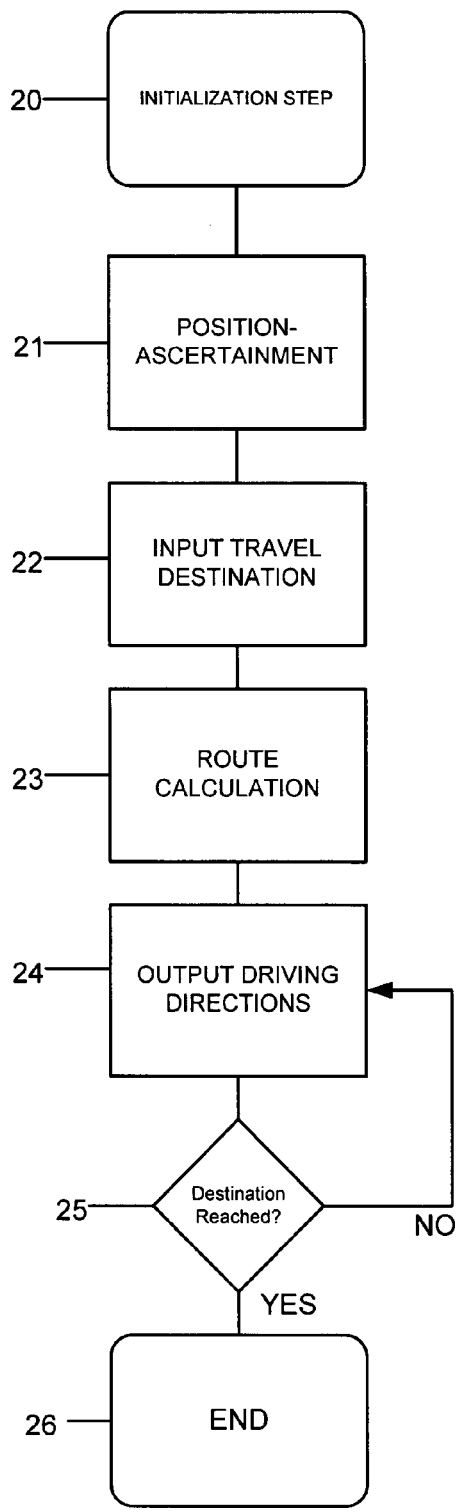
FIG. 2 shows a sequence of the functioning method of the navigation device, including the input of a travel destination according to the present invention.

In FIG. 2, a navigation method is explained, including a travel-destination input according to the present invention. In an initialization step 20, processing unit 1 is switched on, for example, when turning on the vehicle ignition. In a subsequent position-ascertainment step 21, a vehicle position is ascertained by position-ascertainment unit 3 and transmitted to processing unit 1. In a following input step 22, the travel destination is input in the manner according to the present invention. In a subsequent route-calculation step 23, a travel route between the ascertained vehicle position and the input travel destination is calculated by processing unit 1, falling back on a digital map having a road and route network stored in memory unit 4. In a following output step 24, driving directions are output to a driver, preferably via loudspeaker 5. In a following check step 25, it is checked by a position ascertainment with the aid of position-ascertainment unit 3 whether the input travel destination has been reached. If this is the case, the method is ended in a final step 26. If this is not the case, then there is a branching back from check step 25 to output step 24, and the next driving direction is output.

Figure 3:
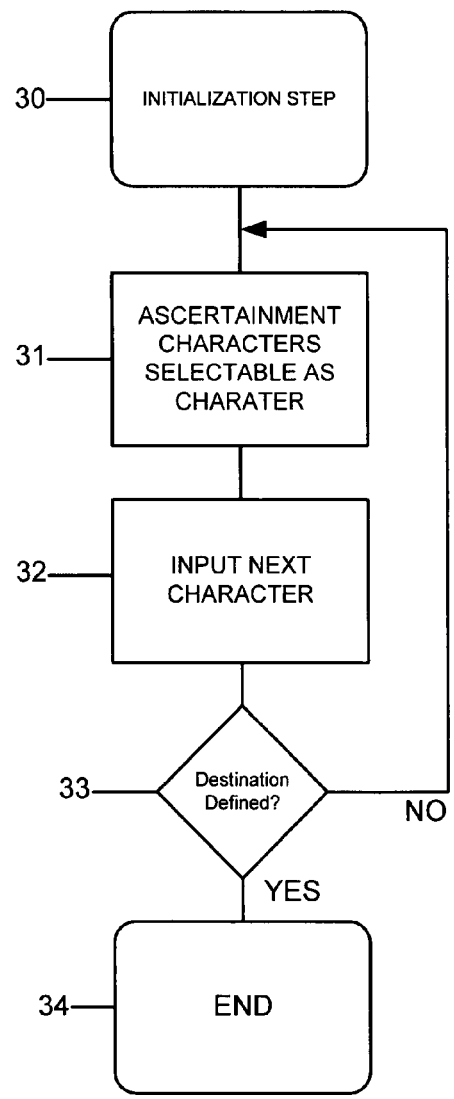
FIG. 3 shows in detail a method according to the present invention for inputting a travel destination.

Input step 22 according to FIG. 2 is depicted in detail in FIG. 3. The input according to the present invention is begun starting from an initialization step 30. In an ascertainment step 31, the characters are ascertained which can be input following the character string input till now, in order that a character string stored in memory unit 4 is produced. If ascertainment step 31 is reached for the first time, it is ascertained in ascertainment step 31 which characters are allowed as first character in the case of all character strings for possible travel destinations stored in memory unit 4. The input characters are represented in an accentuated manner in character field 12 of display 2. In ascertainment step 31, in each case a first selectable character is selected by processing unit 1 and denoted by selection frame 15. In a following input step 32, the next character is input in the manner according to the present invention. In a subsequent check step 33, it is checked whether at this point the travel destination is clearly defined by the characters input till now, in view of the character strings stored in memory unit 4. If this is the case, there is a further branching to a final step 34, and the navigation method described using FIG. 2 is continued with route-calculation step 23. If the travel destination is still not clearly determined in check step 33, then there is a branching back to ascertainment step 31, which is now carried out for the next character to be input.

Figure 4:
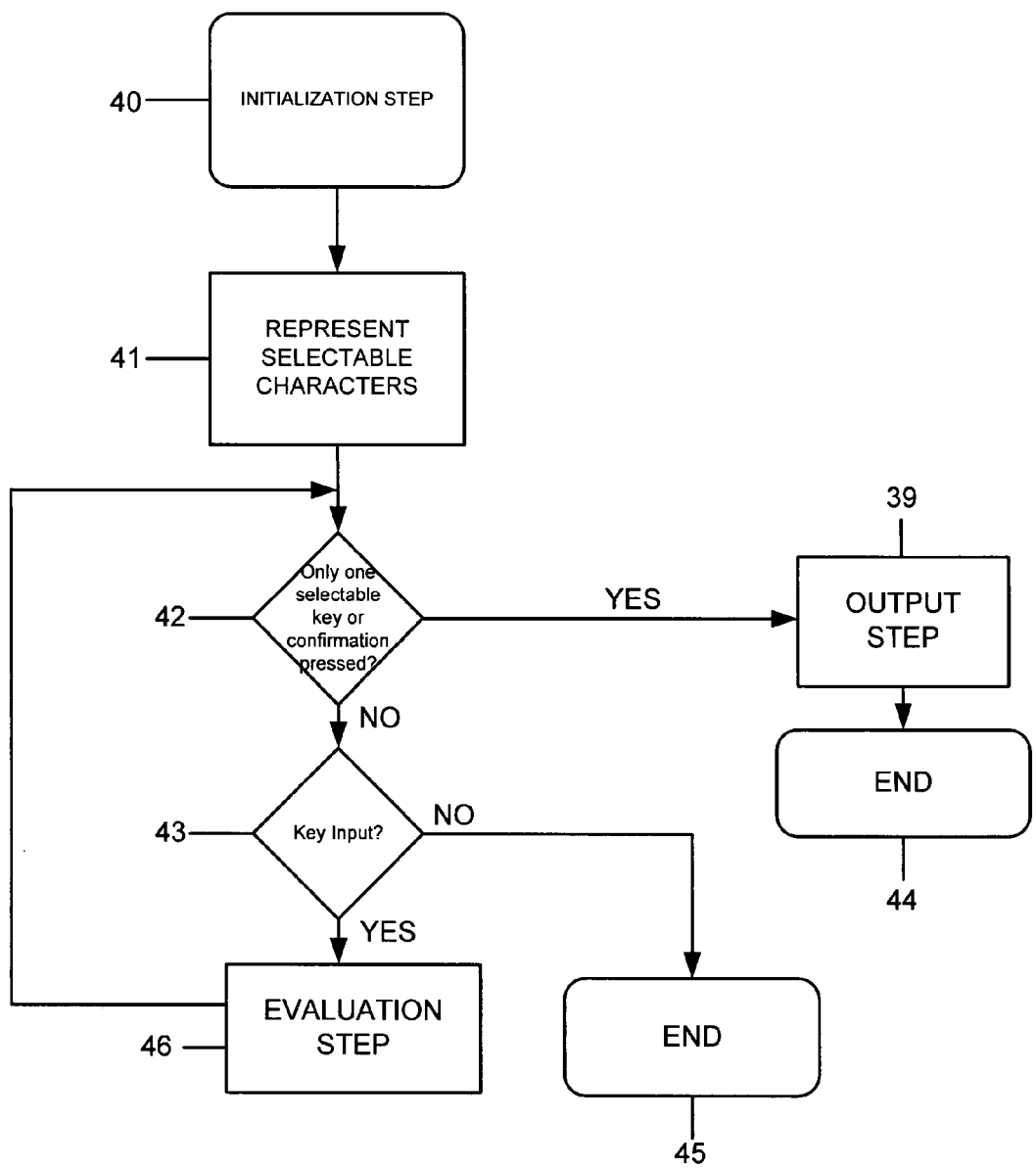
FIG. 4 shows an input according to the present invention with a selection of a character.

Input step 32 according to FIG. 3 is depicted in detail in FIG. 4. Following an initialization step 40 in which the selectable letters, ascertained in ascertainment step 31, are transferred as parameters, that is to say, the letters which permit a combination to form a character string stored in memory unit 4, is a representation step 41 in which the selectable characters are represented with prominence in character field 12, for example, in a different coloring compared to the non-selectable letters. In the preferred exemplary embodiment, all characters are represented, even non-selectable characters, contrasted appropriately by color. In a subsequent first check step 42, it is checked whether only one selectable character is available or whether confirmation key 6 was pressed. If this is the case, there is a further branching to an output step 39 in which the character string, supplemented by the selected character, is displayed in output field 18. Input step 32 is ended in a final step 44, and there is a further branching to check step 33 according to the method sequence which was described for FIG. 3. If confirmation key 6 was not pressed, i.e. it was not possible to ascertain a clear-cut character allocation, the method further branches from first check step 42 to a second check step 43 in which it is first of all queried whether a key entry is being carried out using confirmation key 6 or direction-input device 7. If no input takes place within a predefined time span, e.g. two minutes, there is further branching to a final step 45 and the input is ended. If, on the other hand, it is established that a key was pressed, then there is a further branching to evaluation step 46. After evaluation step 46, there is a branching back to first check step 42.

Figure 5:
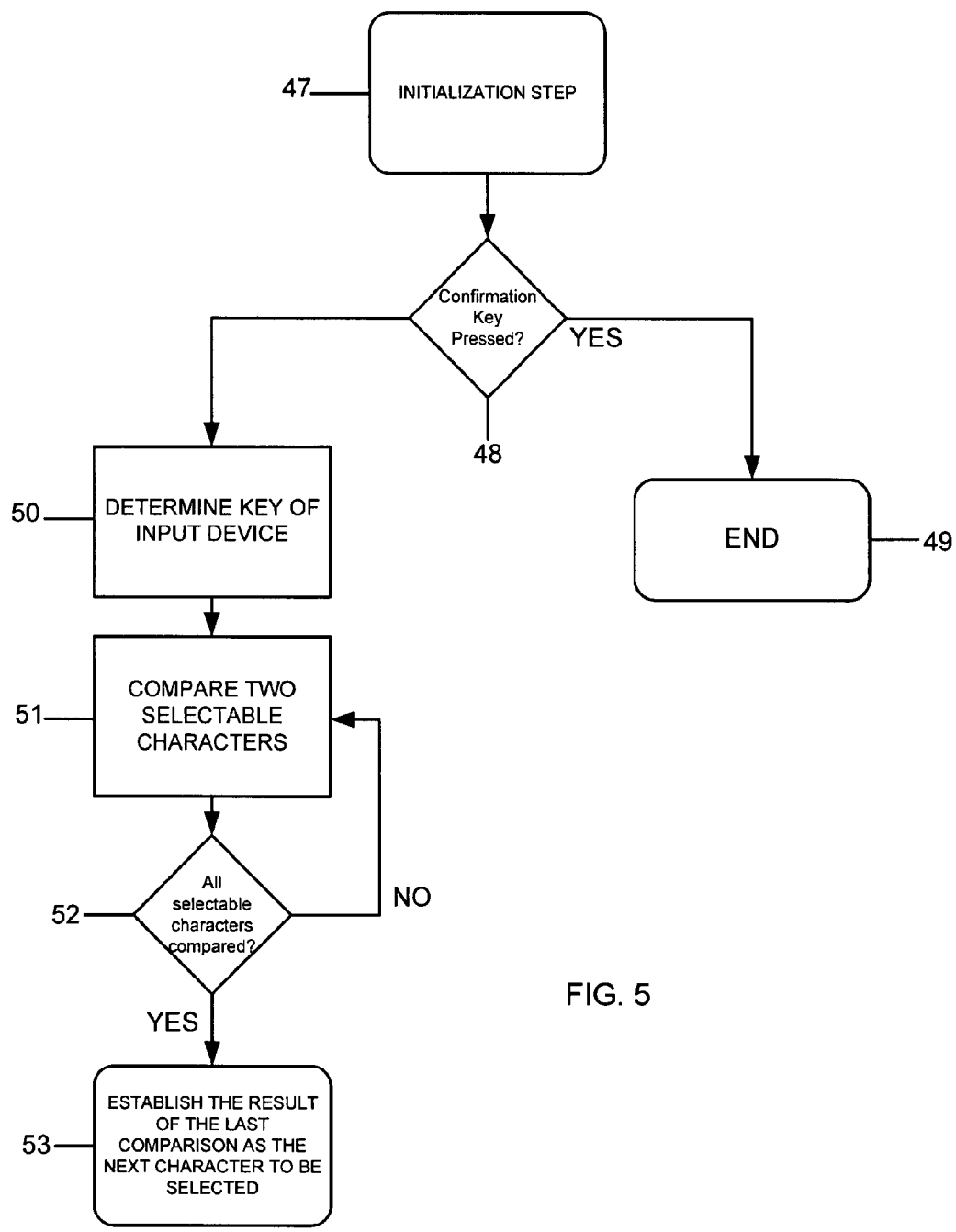
FIG. 5 shows a change between selectable characters as a detail of the method according to the present invention for an input.

FIG. 5 shows evaluation step 46 in detail. Starting from an initialization step 47, it is checked in a subsequent first check step 48 whether confirmation key 6 was pressed. If this is the case, further branching occurs to final step 49, and evaluation step 46 is ended. If this is not the case, routing to an ascertainment step 50 occurs. One key of direction-input device 7 must have been pressed. The key of direction-input device 7 is determined in ascertainment step 50. The selectable characters are already available to processing unit 1 and are preferably ordered alphabetically. In a comparison step 51 following ascertainment step 50, two of the selected characters are compared to each other. In so doing, the character is ascertained which most likely matches the direction input via direction-input device 7. In a subsequent second check step 52, it is checked whether all selectable characters were already compared by comparison step 51 to another selectable character. If this is the case, there is further branching to a final step 53, the result of the last comparison being established as the next character to be selected, to which selection frame 15 is optionally shifted. First check step 42 according to FIG. 4 is subsequently carried out. If, on the other hand, it is determined in second check step 52 that the list was not yet completely processed, then the character ascertained as the result of comparison step 51 is compared to a next selectable character not yet compared, by branching back from second check step 52 to comparison step 51. In one preferred exemplary embodiment, the next character in alphabetical order is selected as the next character.

Figure 6A:
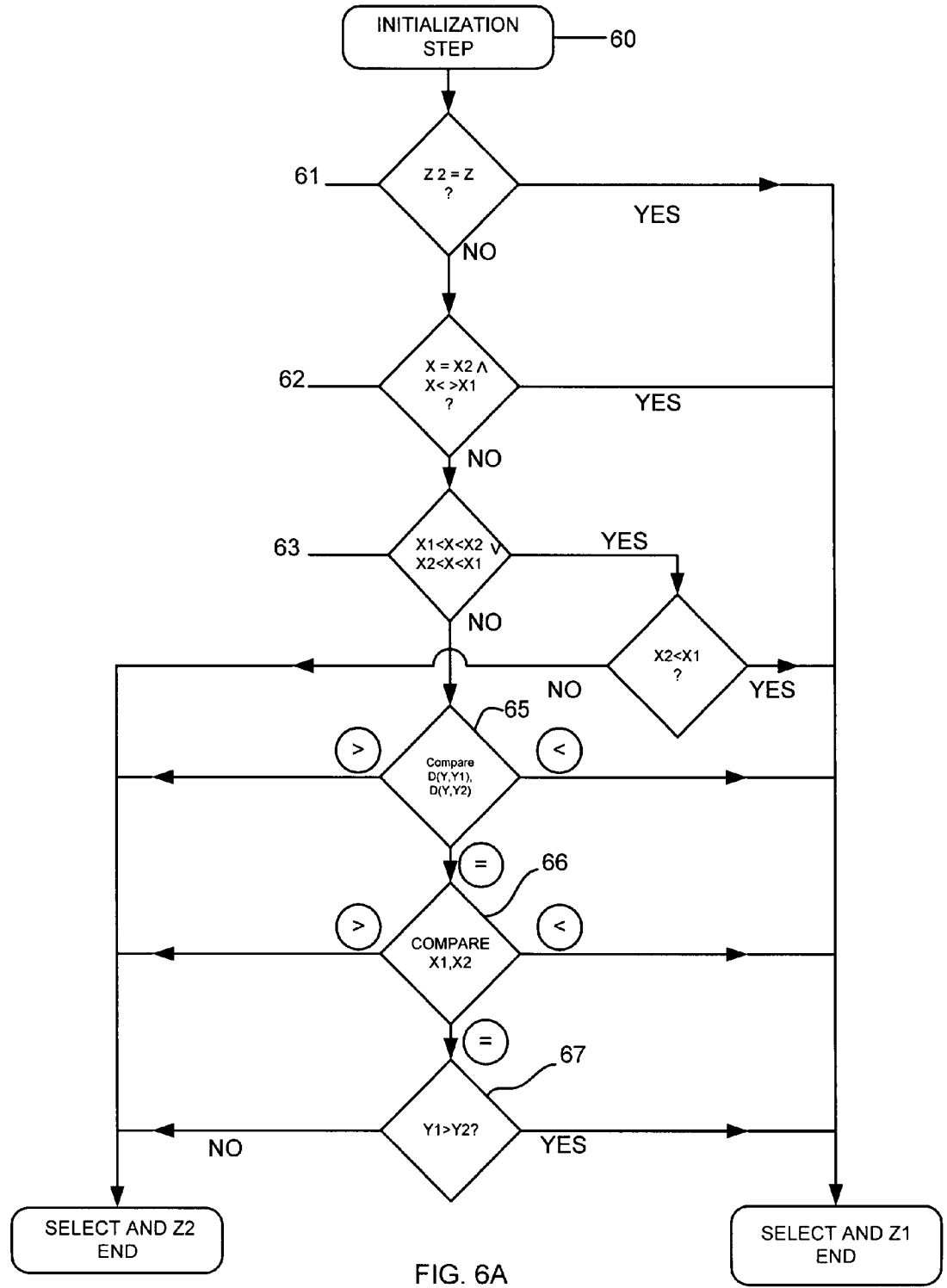
FIG. 6a shows a first exemplary embodiment for a comparison according to the present invention between two selectable characters in order to determine the position of a next inputtable character.

FIG. 6a shows a first exemplary embodiment for implementing comparison step 51 according to the present invention.

First of all, designations for the description of the method are defined for this and the following figures. The inputtable character, denoted with selection frame 15 prior to reaching ascertainment step 50, is designated by placeholder z. In this context, placeholder z is to be distinguished from alphabetical letter "z" itself. z is entered in character field 12, the position of z being denoted by a column value x and a row value y; x and y are likewise placeholders which are to be distinguished from letters "x" and "y". The columns are numbered through from left to right, and the rows are numbered through from top to bottom with whole numbers starting from one. The two characters to be directly compared in comparison step 51 are designated as a character z1 and as a character z2. The positions of z1 and z2 are denoted according to the position of x by placeholders x1 and x2 for a corresponding column, and y1 and y2 for a corresponding row of z1 and z2, respectively. A distance d between two rows or columns is given as the amount difference of the two column values or row values. Distance d between two characters is the sum of distances d of the columns and the rows. In FIG. 6a, the method of the present invention is clarified in terms of a user pressing first key 8 for the direction "to the right". In an initialization step 60, the comparison of two characters is started within comparison step 51. In a first check step 61, it is checked whether character z2 is equal to character z. In this case, z1 is selected as the result of the comparison of z1 and z2, and is used as a new character for a comparison to a character still to be checked, provided all the characters were not yet compared. A further branching occurs to a first final step 80, with which comparison step 51 is ended. If it is established in first check step 61 that z2 is not equal to z, then the method path designated by "f" in FIG. 6a is further pursued to a second check step 62, in which it is checked whether x=x2 and x≠x1, that is to say, that z2 is in the column of z and z1 in a different column than z. If this condition is met, z1 is likewise selected and there is further branching to first final step 80. If this is not the case, then there is further branching to a third check step 63, in which it is checked whether x1<x<x2 or whether x2<x<x1. If this is the case, further branching occurs to a fourth check step 64, in which it is checked whether x2<x1. If this is the case, then there is likewise further branching to first final step 80, and z1 is selected. If this is not the case, further branching occurs to a second final step 82, in which z2 is selected as the result and with which comparison step 51 is likewise ended. If it is established in third check step 63 that the indicated condition x1<x<x2 or x2<x<x1 is not fulfilled, then there is further branching to a fifth check step 65 in which distance d of the rows is checked by carrying out a comparison between y and y1, as well as between y and y2. If d(y, y1)>d(y, y2), then branching occurs to second final step 82. If d(y, y1)<d(y, y2), then there is further branching to first final step 80. If d(y, y1)=d(y, y2), then branching occurs to a sixth check step 66, in which the relationship of x1 to x2 is examined. If x1>x2, branching occurs to second final step 82; if x1<x2, then there is further branching to first final step 80; and if x1=x2, further branching occurs to a seventh check step 67 in which it is checked whether y1>y2. If this is the case, there is further branching to first final step 80, otherwise to second final step 82. Consequently, comparison step 51 is ended and a clear decision between characters z1 and z2 is ensured. The method described with reference to FIG. 6a makes it possible that, when first key 8 of direction-input device 7 is pressed, in the event that no character exists any longer in character field 12 to the right of the initially inputtable character, the character of character field 12 situated furthest to the left is selected. In each case, the character is selected which is situated as near as possible to the row, or even in the row of the character previously denoted by selection frame 15.

Figure 6B:
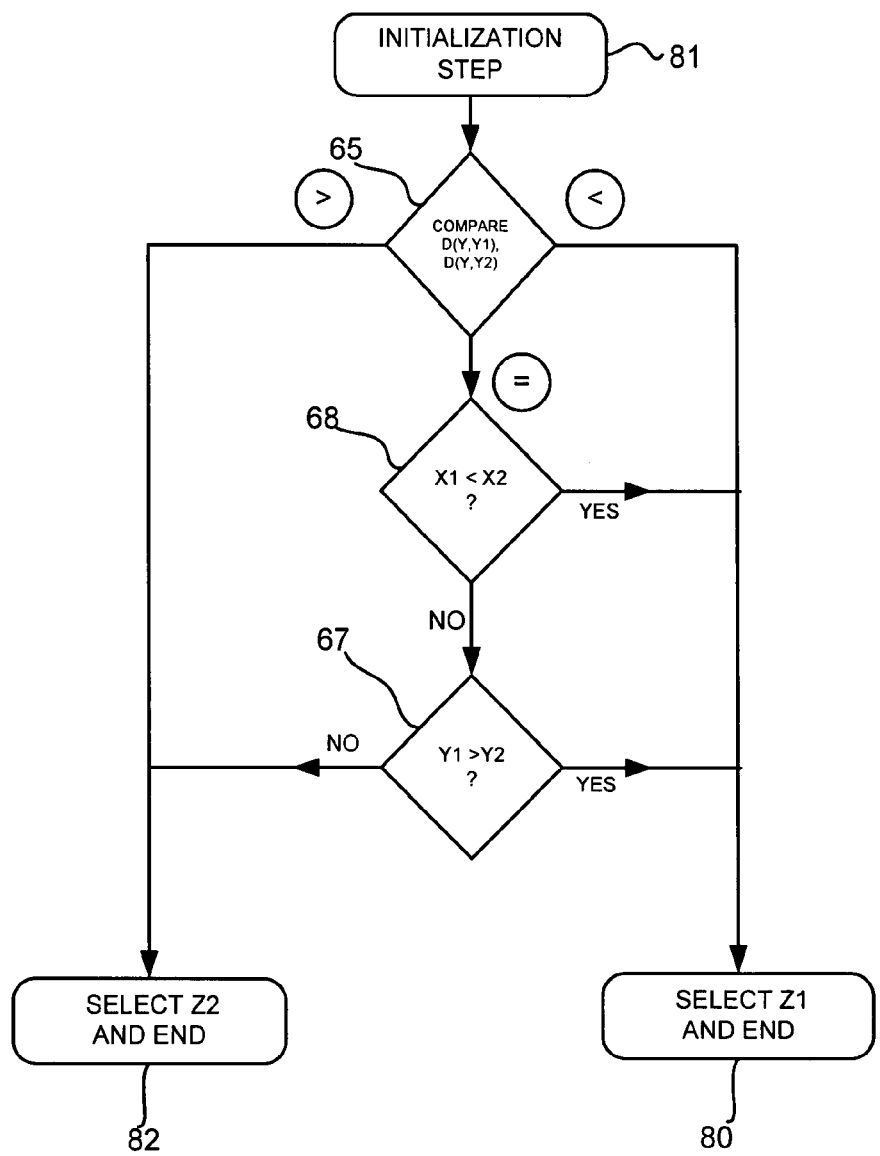
FIG. 6b shows a further exemplary embodiment for such a comparison of two characters.

FIG. 6b shows a further exemplary embodiment for comparison step 51, which is likewise explained in terms of an actuation of first key 8 of direction-input device 7. In the method according to FIG. 6b, upon actuation of first key 8, the selectable elements corresponding to the actuation of first key 8 are already checked in ascertainment step 50 in FIG. 5 with regard to whether only one selectable element is situated to the right of the element previously surrounded by selection frame 15. If this is the case, an inputtable character is established, just as for the case when no selectable character is situated to the right of the previously inputtable character, which then remains the selected element. If no clear allocation is thereby possible, of the selectable characters, all those selectable characters are ascertained in ascertainment step 50 which lie to the right of the previously selected element in character field 12, thus whose column value is greater than the column value of the previously inputtable character. Ascertainment step 50 then begins with an initialization step 81, after which a first check step 65 is carried out which corresponds to fifth check step 65 according to FIG. 6a. Given equality of the row distance, thus given $d(y, y1)=d(y, y2)$, this is followed by a second check step 68 in which it is checked whether $x1<x2$. If this is the case, character $z1$ is selected in first final step 80. If $x1$ is not less than $x2$, then in a third check step 67, which corresponds to seventh check step 67 of FIG. 6a, it is checked whether $y1>y2$. Corresponding to seventh check step 67 of FIG. 6a, a decision is thereby made for a branching to first final step 80 or to second final step 82. By this means, the character is selected which, starting from the previous position, lies to the right of the previously inputtable character as close as possible to the row of the previously inputtable character or even in the row itself.

Figure 7A:
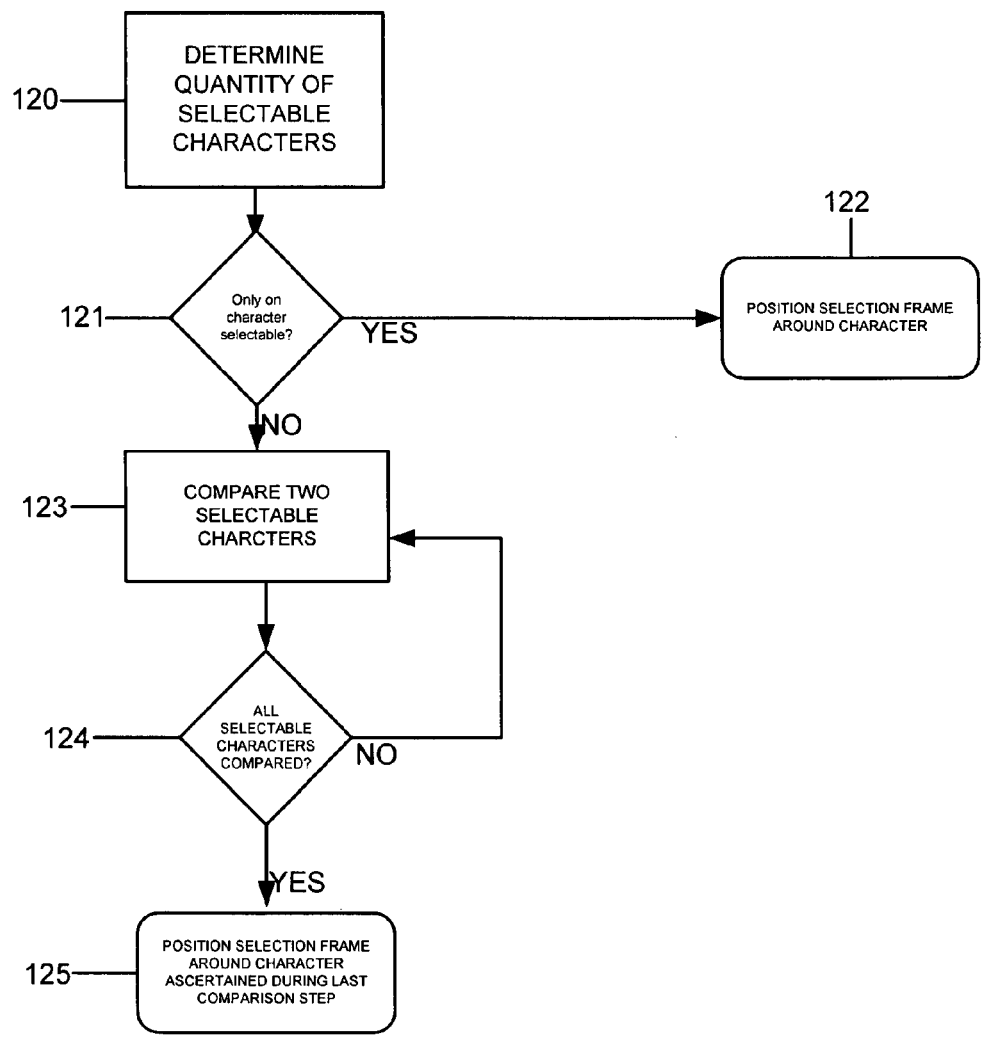
FIG. 7a shows a method according to the present invention for selecting an inputtable character after a character has been input according to the present invention.

FIG. 7a shows in detail an exemplary embodiment for the positioning within ascertainment step 31 according to FIG. 3. In a first determination step 120, the quantity of characters which can still be selected is determined. During a first check step 121, it is checked whether one character only can be selected. If this is the case, then branching occurs to a final step 122 and the selection frame is positioned around this character. The method is continued with input step 32 according to FIG. 3. If an input is not clear-cut, then the selectable characters ascertained in determination step 120 are examined with respect to the character around which selection frame 15 should be positioned. With a comparison step 122 [sic; 123], a check is carried out according to the methods described for FIG. 7b or 7c, two characters being compared to each other in each case. In a subsequent check step 124, it is checked whether all characters were already processed by at least one comparison. If this is not the case, there is a branching back to comparison step 123, and the character ascertained as result during the previous execution of comparison step 123, as well as a next selectable character not yet processed by comparison step 123 are compared during the next execution of comparison step 123. In this context, the next character to be checked is preferably selected according to an alphabetical order. If it is established in check step 124 that the list was processed, there is a branching to a final step 125, and the character ascertained during the last implementation of comparison step 123 is selected as the character around which selection frame 15 is set.

Figure 7B:
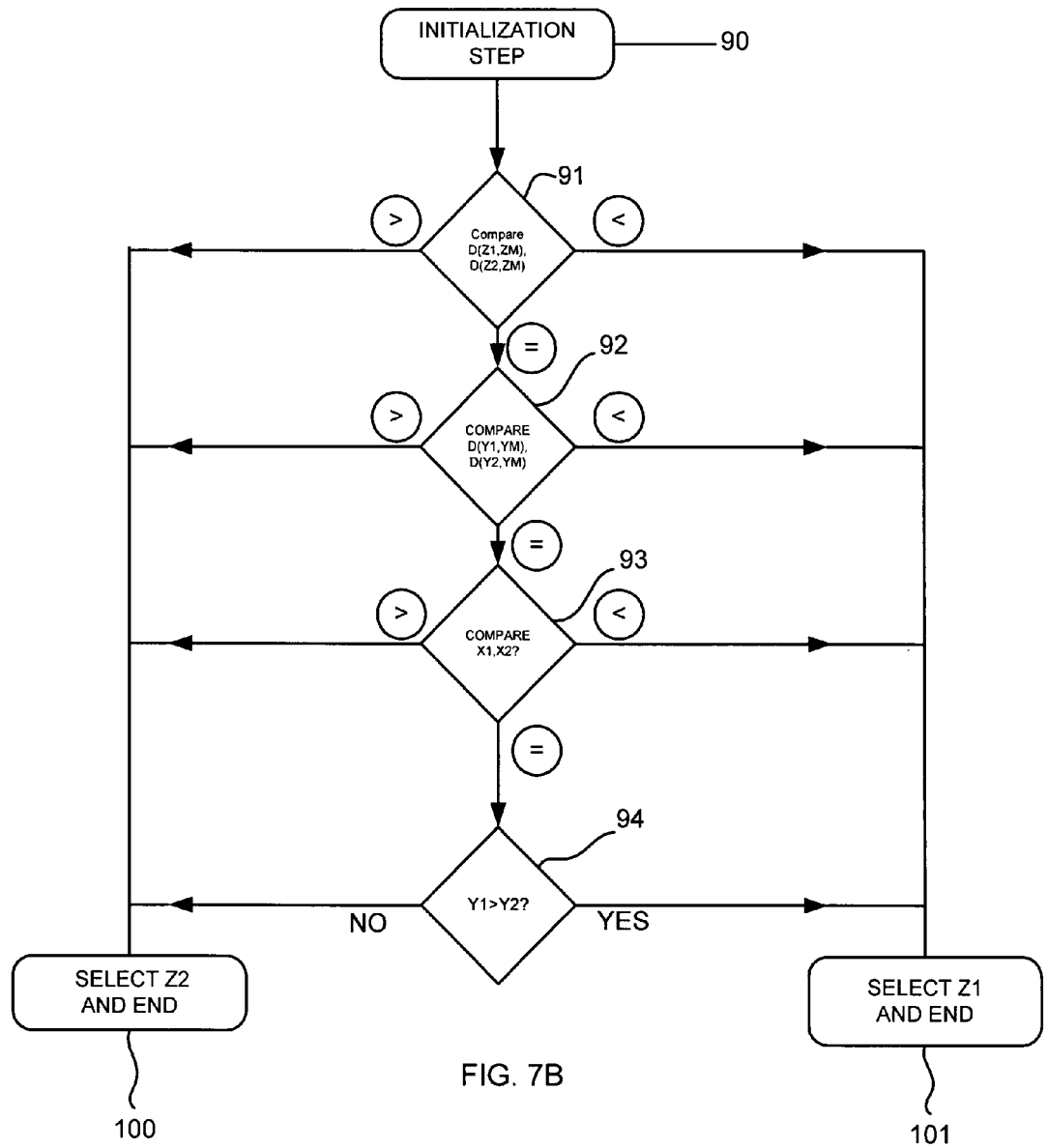
FIG. 7b shows a first exemplary embodiment for comparison of two selectable characters which is used for determining the next inputtable character.

FIG. 7b shows a first exemplary embodiment for a method for comparing two characters for the positioning of selection frame 15 after the selection of a character according to comparison step 123 in FIG. 7a. In this case, a new positioning after the selection of a character is carried out as much in the middle of character field 12 as possible. To this end, an optionally virtual position of a character $zm$ is determined from a center column $xm$ and a center row $ym$ as the center of character field 12. After an initialization step 90, it is checked in a first check step 91, how the sum of the distance of $x1$ to $xm$ and $y1$ to $ym$ is to the sum of the distance $x2$ to $xm$ and $y2$ to $ym$. If $d(z1,zm)>d(z2,zm)$, then $z2$ is selected in a first final step 100 as the next character to be denoted by selection frame 15. If $d(z1,zm)<d(z2,zm)$, then in a second final step 101, $z1$ is selected as the character to be denoted. In the case of equality, there is a further branching to a second check step 92. In the second check step, $d(y1,ym)$ is compared to $d(y2,ym)$. If $d(y1,ym)>d(y2,ym)$, then branching takes place to first final step 100, in which Z2 is selected as the character to be denoted by selection frame 15. If $d(y1,ym)<d(y2,ym)$, there is a branching to second final step 101. In the case of equality, branching takes place to a third check step 93 in which it is checked how $x1$ is to $x2$. If $x1>x2$, there is branching to first final step 100. If $x1<x2$, branching takes place to second final step 101, and if $x1=x2$, then branching is carried out to fourth check step 94, in which it is checked whether $y1>y2$. If this is the case, there is branching to second final step 101, otherwise to first final step 100. Selection frame 15 is thereby arranged as much in the middle of character field 12 as possible.

Figure 7C:
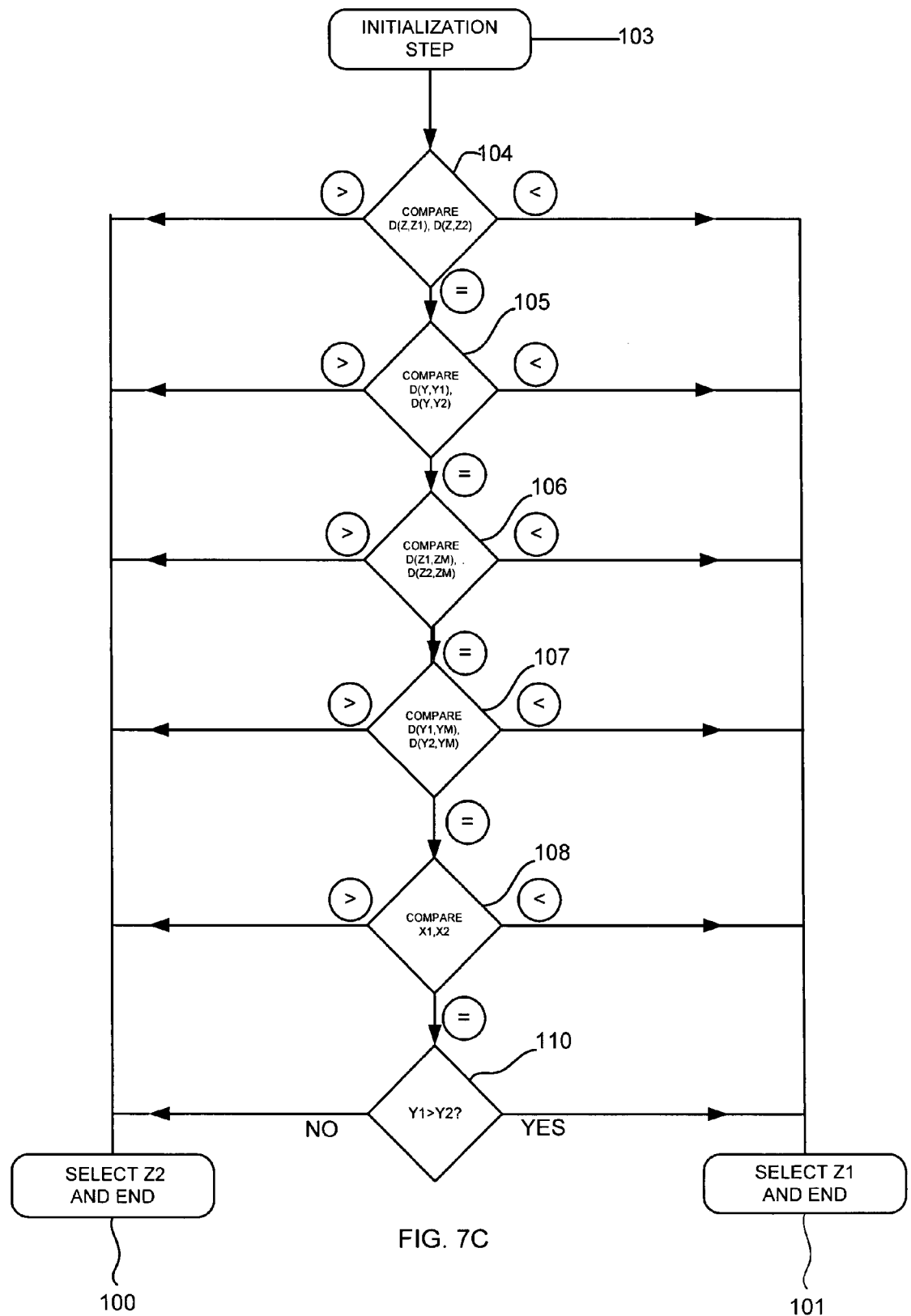
FIG. 7c shows a second exemplary embodiment for such a comparison of two characters.

FIG. 7c shows a further exemplary embodiment for a comparison step 123. Following an initialization step 103 is a first check step 104 in which $d(z,z1)$ is compared to $d(z,z2)$. Given equality, branching occurs to second check step 105 in which $d(y,y1)$ is compared to $d(y,y2)$. Given equality, branching occurs to a subsequent third check step 106, in which $d(z1,zm)$ is compared to $d(z2,zm)$. Given equality, branching occurs to a subsequent fourth check step 107, in which $d(y1,ym)$ is compared to $d(y2,ym)$. Given equality, in subsequent fifth check step 108, $x1$ is compared to $x2$. Given equality, following it is a sixth check step 110 in which it is checked whether $y1>y2$. If no, branching occurs to a first final step 100 in which $z1$ [sic] is selected as the character around which selection frame 15 is to be positioned. If yes, branching occurs to a second final step 101 in which $z2$ [sic] is selected as the character provided for this. If it is determined in one of the preceding check steps 104, 105, 106, 107, 108, starting from first check step 104 to the fifth check step, that the quantity first named in each case above is smaller than the quantity named in each case in the second position, then branching likewise occurs to first final step 100 and further check steps are no longer carried out. If, on the other hand, it is determined in one of the check steps that the second named quantity is smaller than the respective first, then branching occurs to second final step 101, and further check steps are likewise no longer carried out. Selection frame 15 is thereby positioned as near as possible to the previously input character.

Figure 8A:
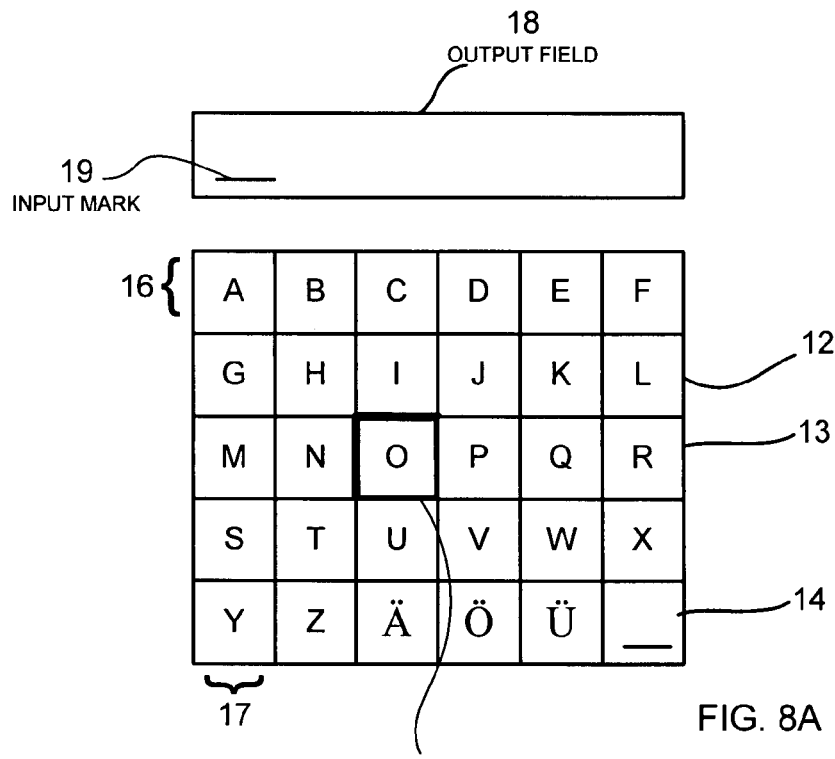
FIGS. 8a through 8j show a display representation for an implementation of the method according to the present invention, given the use of a comparison described with reference to FIG. 6b.
Figure 8B:
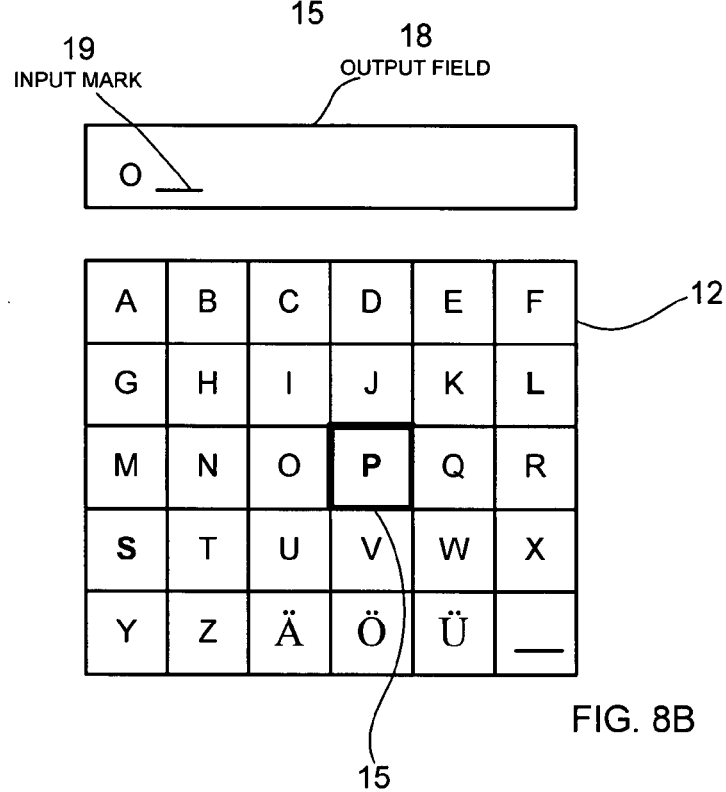
Figure 8C:
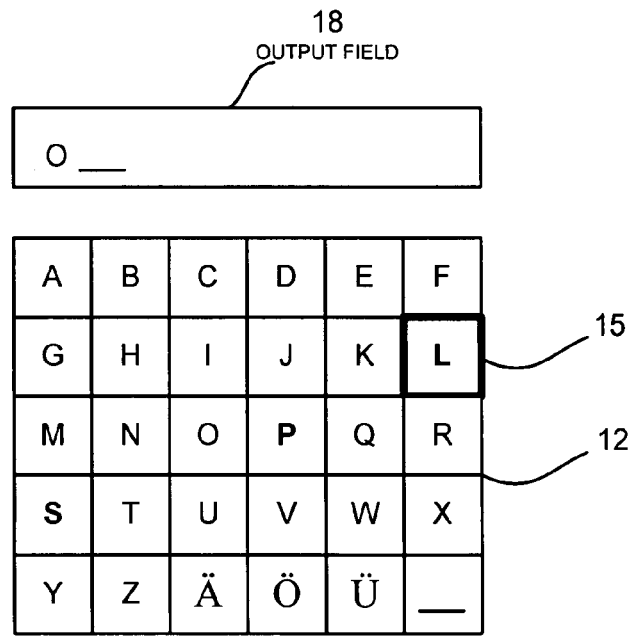
Figure 8D:
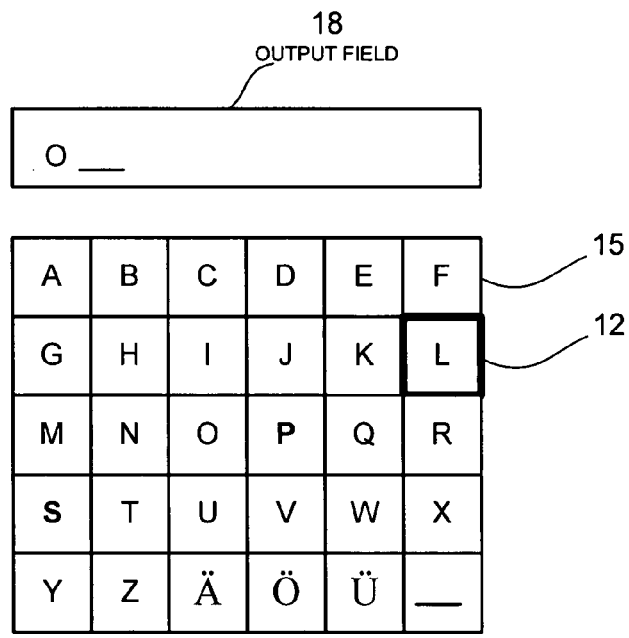
Figure 8E:
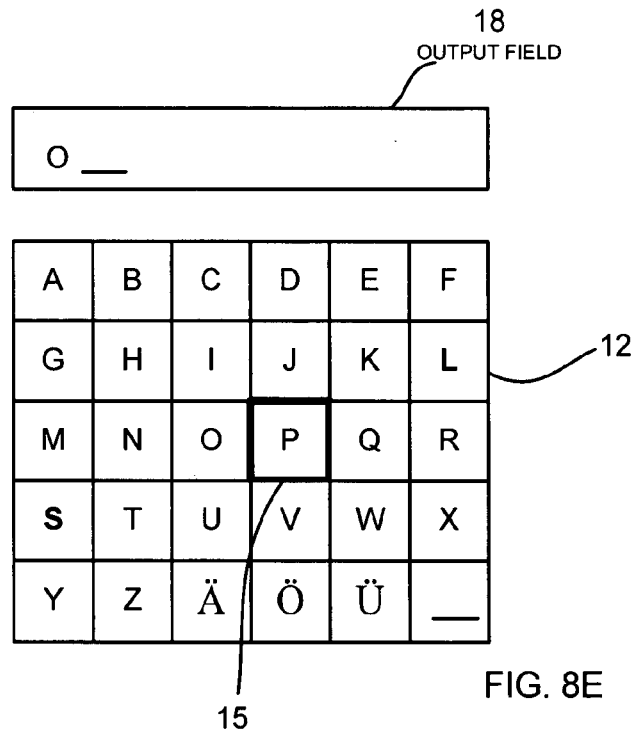
Figure 8F:
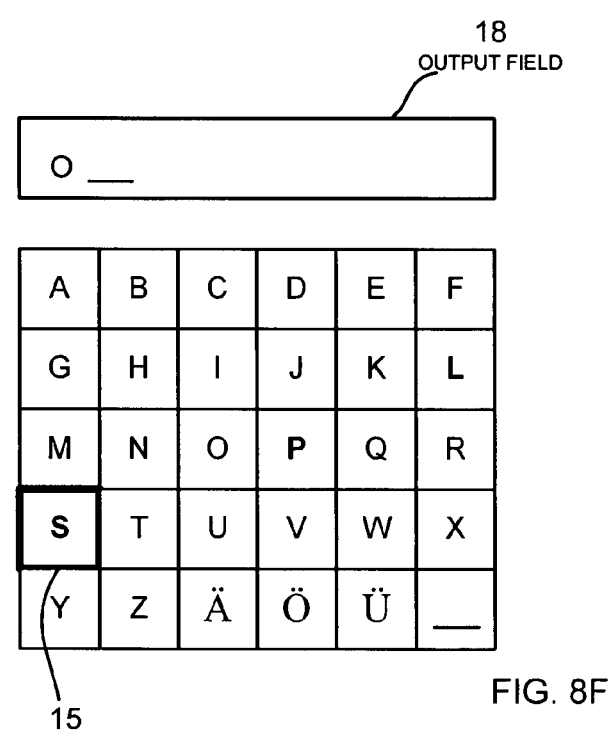
Figure 8G:
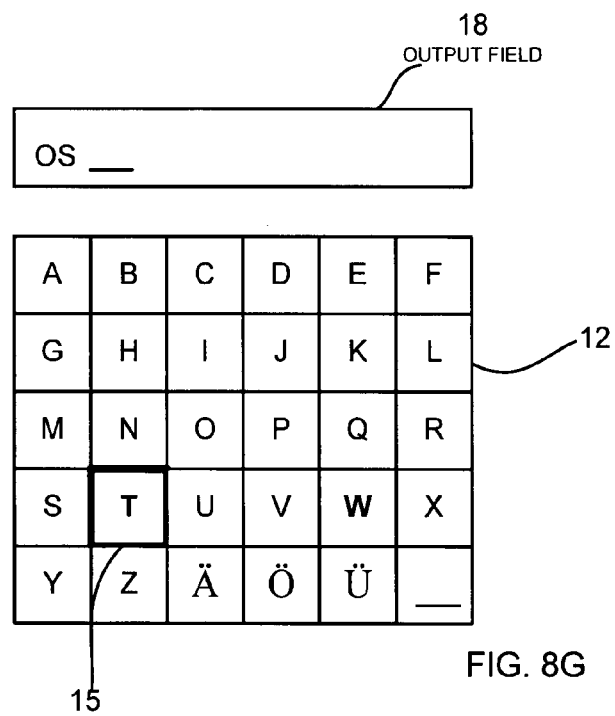
Figure 8H:
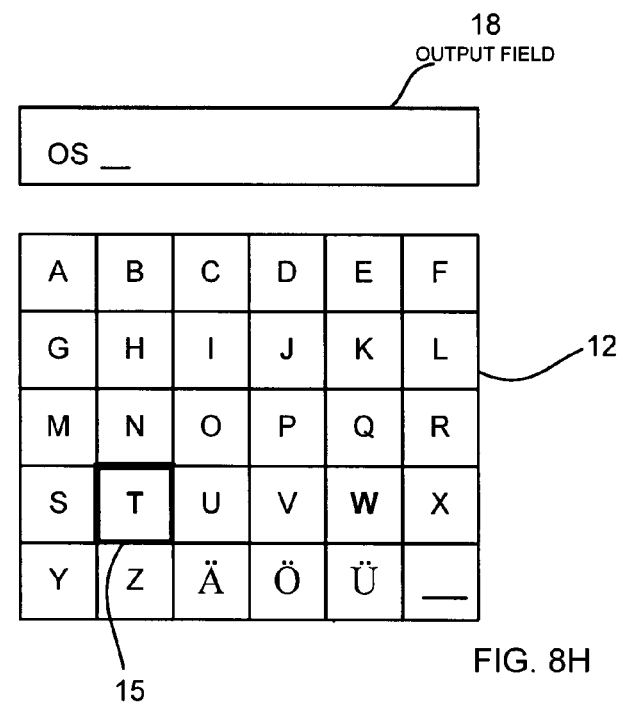
Figure 8I:
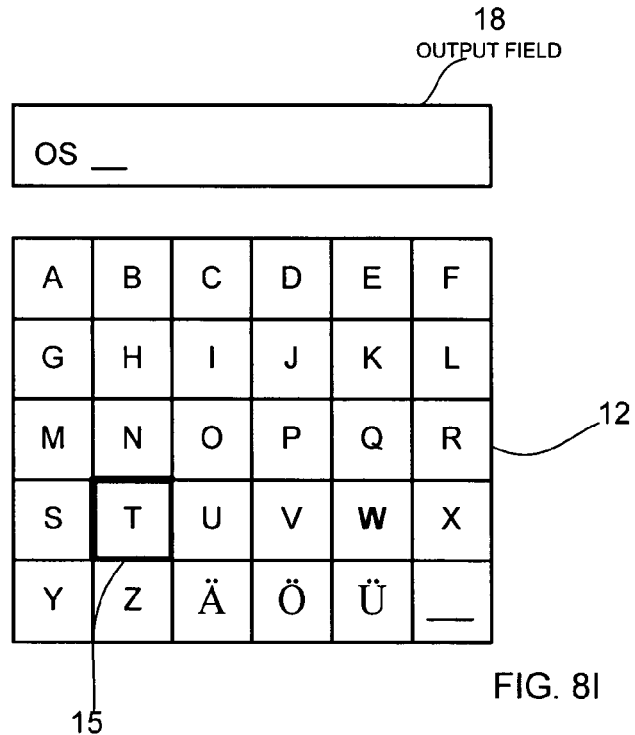
Figure 8J:
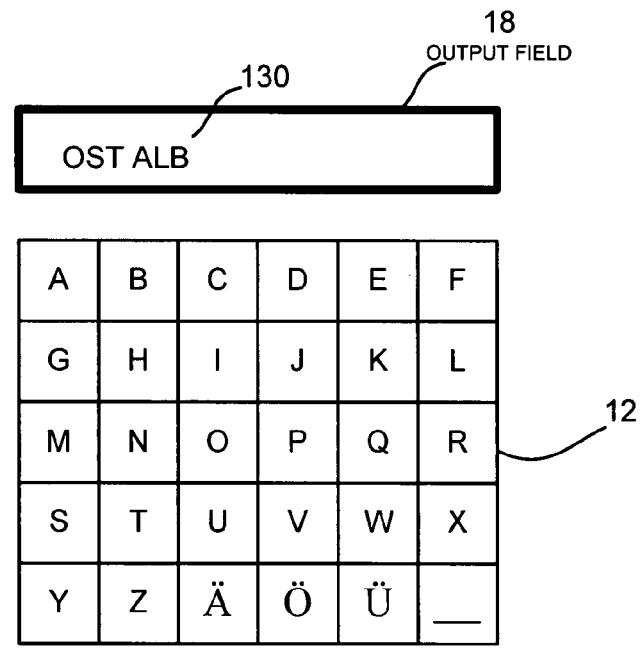

With reference to FIGS. 8a through 8j, the method is described in terms of a display 2; a new inputtable character is set in the middle of character field 12, and selection frame 15 is unable to be moved across the edge of character field 12 to the opposite side of the edge of character field 12 (thus corresponding to the comparison described for FIG. 6b). FIG. 8a shows character field 12 corresponding to display 2 in FIG. 1. Given an initial central positioning according to the method described in FIG. 7b, letter O is selected as the first character around which selection frame 15 is positioned. Up to this point, the character string is empty; only input mark 19 is indicated in output field 18. All characters except for blank character 14 are selectable. The user subsequently actuates confirmation key 6. Letter O is thereby input. As shown in FIG. 8b, letters S, P and L are subsequently selectable as the next characters, since the input is restricted by the letter O to names stored in memory unit 4. In this exemplary embodiment, they are "Oldenburg", "Opperhausen", "Ost Alb" and "Oswald". In this context, selection frame 15 is set on "P", the next selectable character from "O". The letter O is displayed in output field 18. The user subsequently actuates first key 8 "to the right". Selection frame 15 is set on "L", the next selectable character to the right of P, which is shown in FIG. 8c. The user subsequently actuates first key 8 again. The selection frame is not shifted, since no selectable character exists right of "L". The display representation in FIG. 8d remains according to FIG. 8c. The user actuates third key 10 "to the left". Selection frame 15 is set on "P", the next selectable character to the left of "L". This is shown in FIG. 8e. The user subsequently actuates third "to the left" key 10 again. Selection frame 15 is set on "S", the next selectable character to the left of "P", as shown in FIG. 8f. The user actuates confirmation key 6. FIG. 8g shows that "S" was now received into output field 18. Selection frame 15 was shifted to letter T. The selection is now restricted to the names "Ost Alb" and "Oswald". The user actuates third key 10 "to the left" again. Selection frame 15 is not shifted, which is shown in FIG. 8h, since no further selectable character is located in character field 12 left of "T". The user subsequently actuates fourth key 11 "up". Selection frame 15 is again not shifted, which is shown in FIG. 8i, since no further character exists in the direction "up" in character field 12 either. The user actuates confirmation key 6 and consequently inputs the letter T. The processing unit thereby recognizes the unambiguity of the selection of the character string. The character string "Ost Alb" 130 is selected and is displayed in output field 18, which is now shown with prominence. No letter is selectable any longer in character field 12 itself, since a clear input of a character string has already been carried out.

Figure 9A:
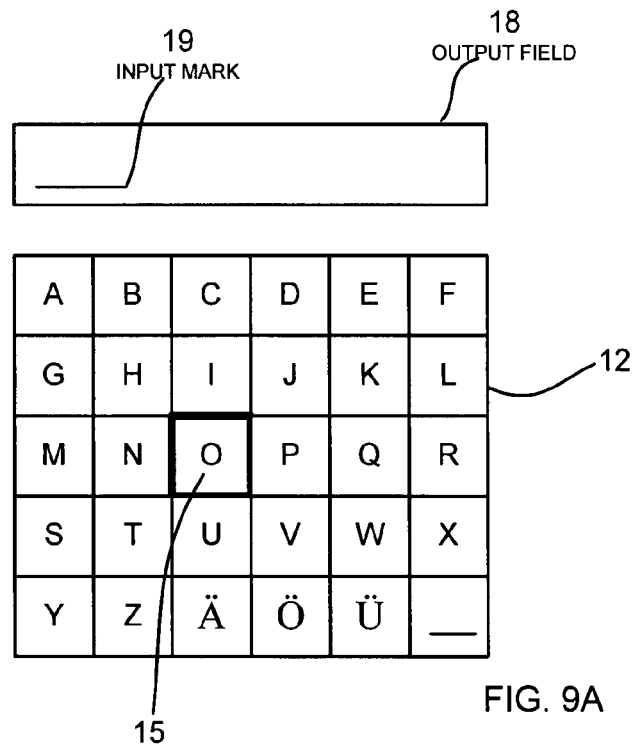
Figure 9B:
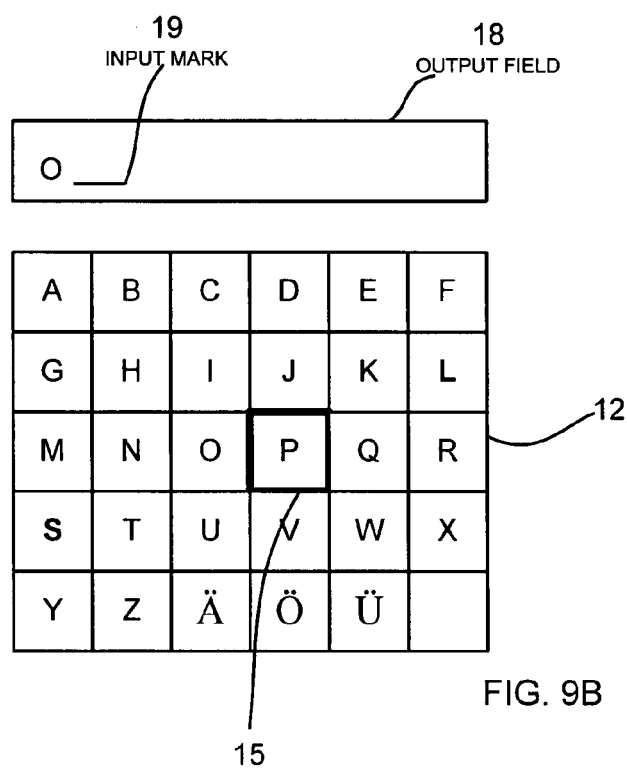
Figure 9C:
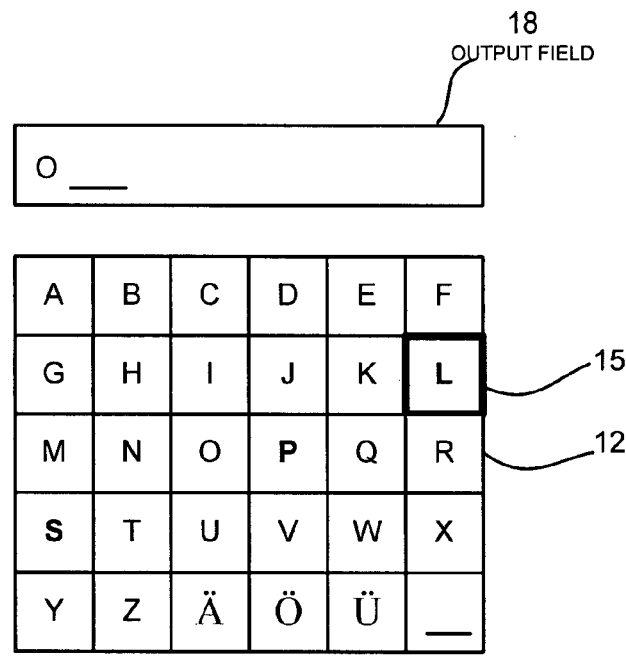
Figure 9D:
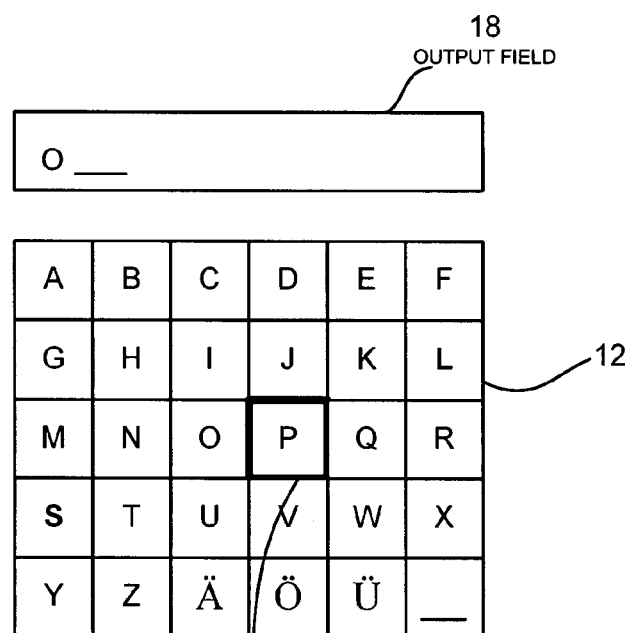
Figure 9E:
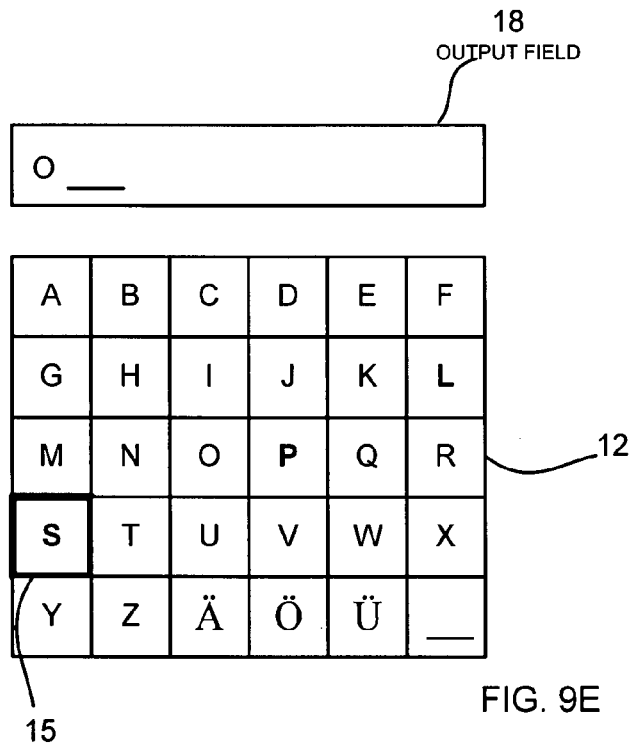
Figure 9F:
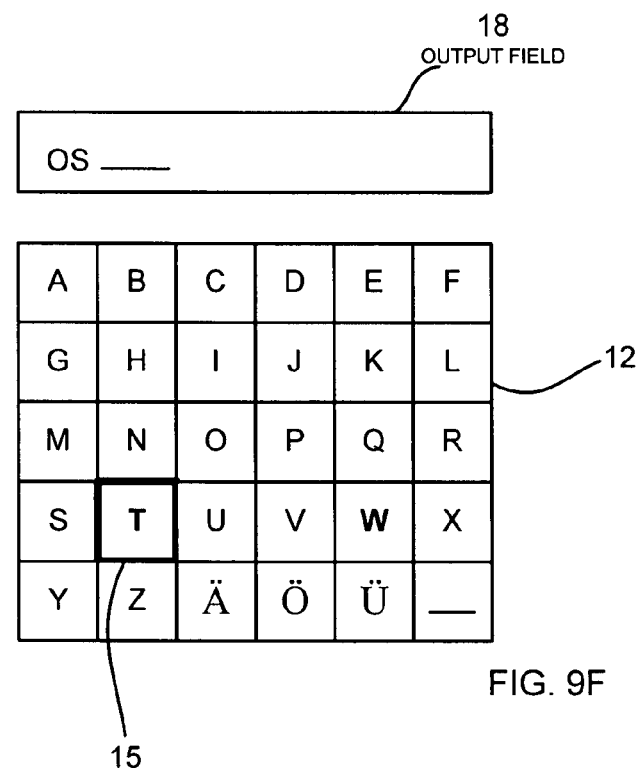
Figure 9G:
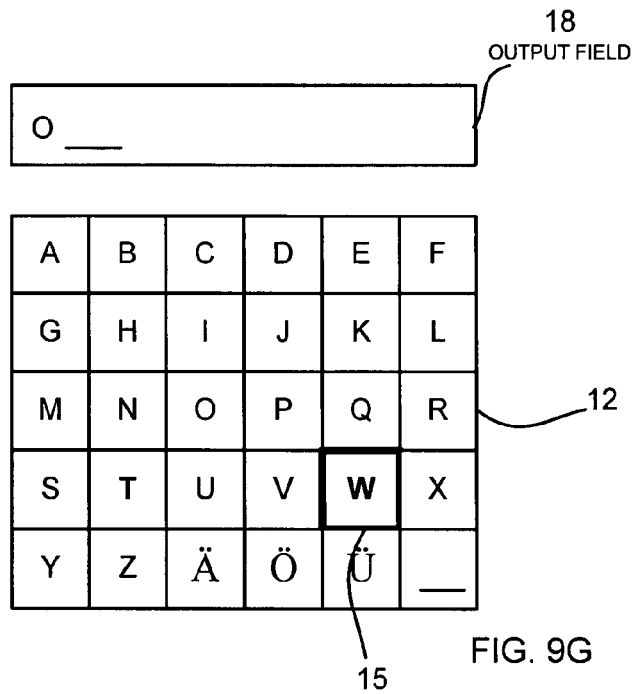
Figure 9H:
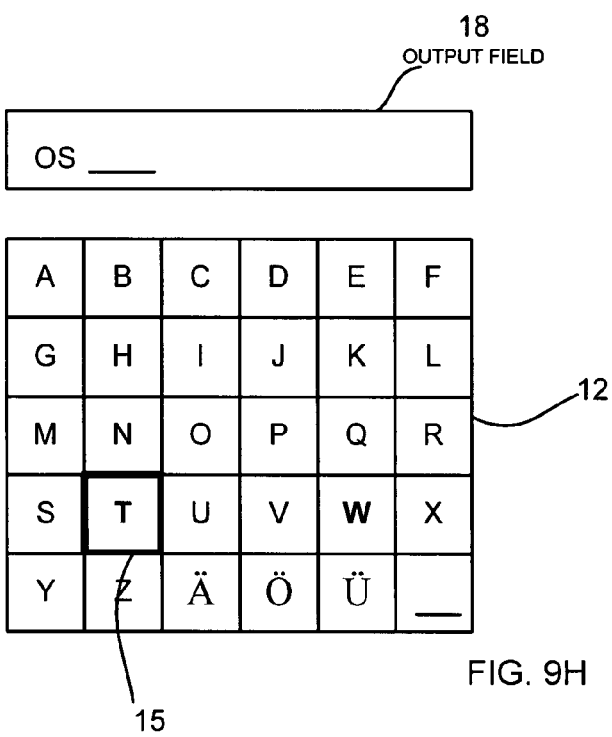
Figure 9I:
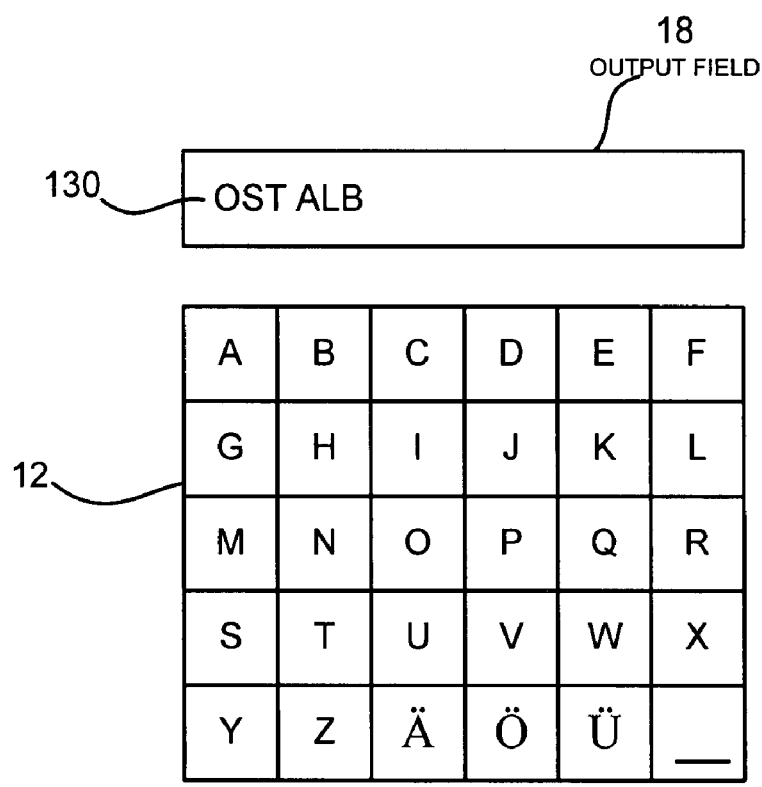

With reference to FIGS. 9a through 9i, a second exemplary embodiment is presented for a selection of a character with so-called "wrap around", a shift of the selection frame beyond the edge of character field 12 to the opposite side of character field 12 also being possible. In this exemplary embodiment, the data stored in memory unit 4 corresponds to the data indicated for the clarification with respect to FIG. 9a. In this context, up to FIG. 9c, the input corresponds to the inputs for FIGS. 8a through 8c, thus pressing of confirmation key 6 and single actuation of first key 8 "to the right". Following this, first key 8 "to the right" is actuated again. In so doing, selection frame 15 is set on the next selectable character from L, as close as possible in the row of "L". Since there are no more selectable characters to the right of L, the search is continued at the left edge of character field 12, and the letter P is denoted by selection frame 15. This is shown in FIG. 9d. The user subsequently actuates third key 10 "to the left", and the letter S is selected, as shown in FIG. 9e. The user actuates the confirmation key, so that "S" is input and added to the character string in output field 18. This is shown in FIG. 9f, as well as a shift of the selection frame to the letter T. The user actuates the key "to the left". Since only one further letter is present in the same row, selection frame 15 is shifted to the letter w, as shown in FIG. 9g. The user actuates fourth key 111 "up". Since no further letter is present in the character field higher up, selection frame 15 is shifted to the other selectable letter T, which is shown in FIG. 9h. The user subsequently actuates confirmation key 6, so that the character string "Ost Alb" is likewise selected as the only possible character string and is displayed in output field 18.

What is claimed is:

1. A method for inputting a character string into a processing unit, comprising:
   storing character strings in a memory unit;
   ascertaining selectable characters for a next character of the character string to be input by the processing unit by a comparison of previously input characters to the stored character strings;
   indicating the selectable characters with prominence in a display; and
   indicating one of the selectable characters as a character to be input and inputting the one of the selectable characters as a next character of the character string to be input by a confirmation input, wherein:
   the selectable characters are shown in a two-dimensional field,
   using a direction input, a change is made from an inputtable character only and directly to one of the selectable characters lying in an input direction in the two-dimensional field with respect to the inputtable character, and
   the one of the selectable characters to which the change is made is indicated as the inputtable character.

2. The method as recited in claim 1, wherein:
   the processing unit includes a navigation device in a vehicle.

3. The method as recited in claim 1, further comprising:
   performing the direction input via an operating element by selecting one of a down direction, an up direction, a left direction, and a right direction.

4. The method as recited in claim 3, wherein:
   the operating element includes one of a cross rocker, a key field, a trackball, and a joystick.

5. The method as recited in claim 1, further comprising:
   if no selectable character in the two-dimensional field lies in an input direction, outputting an error message.

6. The method as recited in claim 5, wherein:
   the error message is acoustic.

7. The method as recited in claim 1, wherein:
   a character string already clearly defined by an input is supplemented by the processing unit to form a complete character string.

8. The method as recited in claim 1, wherein:
   the method is for inputting a travel destination into a navigation device.

9. The method of claim 1, wherein the inputtable character is set off by a selection frame, and is confirmed for selection by pressing a confirmation key.

10. A method for inputting a character string into a processing unit, comprising:
    storing character strings in a memory unit;
    ascertaining selectable characters for a next character of the character string to be input by the processing unit by a comparison of previously input characters to the stored character strings;
    indicating the selectable characters with prominence in a display; and
    indicating one of the selectable characters as a character to be input and inputting the one of the selectable characters as a next character of the character string to be input by a confirmation input, wherein:
    the selectable characters are shown in a two-dimensional field,
    using a direction input, a change is made from an inputtable character to one of the selectable characters lying in an input direction in the two-dimensional field with respect to the inputtable character, the one of the selectable characters to which the change is made is indicated as the inputtable character, the two-dimensional field includes rows and columns of characters, upon the direction input corresponding to one of a left direction and a right direction, a change is made to a selectable character whose column in the two-dimensional field is one of to the right and to the left of a column of the previously inputtable character and whose row at the same time is closest to a row of the previously inputtable character, and upon the direction input corresponding to one of a down direction and an up direction, a change is made to a selectable character whose row in the two-dimensional field lies one of below and above the row of the previously inputtable character, and whose column at the same time is closest to the column of the previously inputtable character.

11. The method as recited in claim 10, wherein:

for the case that in the direction input, the plurality of selectable characters lie equally close to the previously inputtable character with respect to one of the row and the column, that character is selected from these characters which lie closest to the previously inputtable character.

12. A method for inputting a character string into a processing unit, comprising:

storing character strings in a memory unit;

ascertaining selectable characters for a next character of the character string to be input by the processing unit by a comparison of previously input characters to the stored character strings;

indicating the selectable characters with prominence in a display; and indicating one of the selectable characters as a character to be input and inputting the one of the selectable characters as a next character of the character string to be input by a confirmation input, wherein:

the selectable characters are shown in a two-dimensional field, using a direction input, a change is made from an inputtable character to one of the selectable characters lying in an input direction in the two-dimensional field with respect to the inputtable character, the one of the selectable characters to which the change is made is indicated as the inputtable character, the two-dimensional field includes rows and columns of characters, upon the direction input corresponding to one of a right direction and a left direction, a change is made to a selectable character whose column in the two-dimensional field is one of to the right and to the left of a column of the previously inputtable character and whose column at the same time is closest to a column of the previously inputtable character, and upon the direction input corresponding to one of a down direction and an up direction, a change is made to a selectable character whose row in the two-dimensional field lies one of below and above a row of the previously inputtable character, and whose row at the same time is closest to a row of the previously inputtable character.

13. The method as recited in claim 12, wherein:

for the case that in the direction input, the plurality of selectable characters lie equally close to the previously inputtable character with respect to one of the row and the column, that character is selected from these characters which lie closest to the previously inputtable character.

14. A method for inputting a character string into a processing unit, comprising:

storing character strings in a memory unit;

ascertaining selectable characters for a next character of the character string to be input by the processing unit by a comparison of previously input characters to the stored character strings;

indicating the selectable characters with prominence in a display; and indicating one of the selectable characters as a character to be input and inputting the one of the selectable characters as a next character of the character string to be input by a confirmation input, wherein:

the selectable characters are shown in a two-dimensional field, using a direction input, a change is made from an inputtable character to one of the selectable characters lying in an input direction in the two-dimensional field with respect to the inputtable character, the one of the selectable characters to which the change is made is indicated as the inputtable character, and if no selectable character in the two-dimensional field lies in an input direction, continuing a search for a next selectable character starting from an edge in a selected direction opposite an edge lying in the input direction.

15. A method for inputting a character string into a processing unit, comprising:

storing character strings in a memory unit;

ascertaining selectable characters for a next character of the character string to be input by the processing unit by a comparison of previously input characters to the stored character strings;

indicating the selectable characters with prominence in a display; and indicating one of the selectable characters as a character to be input and inputting the one of the selectable characters as a next character of the character string to be input by a confirmation input, wherein:

the selectable characters are shown in a two-dimensional field, using a direction input, a change is made from an inputtable character to one of the selectable characters lying in an input direction in the two-dimensional field with respect to the inputtable character, the one of the selectable characters to which the change is made is indicated as the inputtable character, and after an input of a character and before a character string is clearly selected, one of the character selected before and a character nearest to the previously selected character is selected as a character inputtable via the confirmation input.

16. A method for inputting a character string into a processing unit, comprising:

storing character strings in a memory unit;

ascertaining selectable characters for a next character of the character string to be input by the processing unit by a comparison of previously input characters to the stored character strings;

indicating the selectable characters with prominence in a display; and indicating one of the selectable characters as a character to be input and inputting the one of the selectable characters as a next character of the character string to be input by a confirmation input, wherein:

the selectable characters are shown in a two-dimensional field, using a direction input, a change is made from an inputtable character to one of the selectable characters lying in an input direction in the two-dimensional field with respect to the inputtable character, the one of the selectable characters to which the change is made is indicated as the inputtable character, and after the input of a character and before a character string is clearly selected, selecting one of a character in the middle of the two-dimensional field and a character nearest to the middle of the two-dimensional field as a character inputtable via the confirmation input.

17. A device for inputting a character string into a processing unit, comprising:

an arrangement for storing character strings in a memory unit;

an arrangement for ascertaining selectable characters for a next character of the character string to be input by the processing unit by a comparison of previously input characters to the stored character strings;

an arrangement for indicating the selectable characters with prominence in a display; and an arrangement for indicating one of the selectable characters as a character to be input and inputting the one of the selectable characters as a next character of the character string to be input by a confirmation input, wherein:

the selectable characters are shown in a two-dimensional field, using a direction input, a change is made from an inputtable character only and directly to one of the selectable characters lying in an input direction in the two-dimensional field with respect to the inputtable character; and the one of the selectable characters to which the change is made is indicated as the inputtable character.

18. The method of claim 17, wherein the inputtable character is set off by a selection frame, and is confirmed for selection by pressing a confirmation key.

* * * * *